UNITED STATES PATENT OFFICE.

JAMES OLNEY BROWN, OF CHICAGO, ILLINOIS.

ELECTRIC INSULATING MATERIAL.

SPECIFICATION forming part of Letters Patent No. 542,462, dated July 9, 1895.

Application filed May 5, 1894. Serial No. 510,168. (Specimens.)

*To all whom it may concern:*

Be it known that I, JAMES OLNEY BROWN, a citizen of the United States, and a resident of Chicago, in the county of Cook and State of Illinois, have invented certain new and useful Improvements in Electric Insulating Material, of which the following is a full, clear, and exact description.

The object of my invention is to provide a perfect and cheap electric insulating material, which, like glass, can be molded into any shape desired, but which is more dense and stronger and more durable than glass, besides being impervious to moisture and incapable of sulphating, substantially as hereinafter fully described.

My improved insulating material is made of a fine grade of quartz, which, by the use of pyrites of iron and oxide of manganese, has been reduced to a slag. The quartz used may be spent gold-bearing quartz or other metal-bearing quartz, which, after it is crushed, is treated with pyrites of iron and manganese under a sufficient heat to fuse it and to produce the slag which constitutes the subject of my invention.

In making my improved material I prefer to use about equal proportions of quartz, pyrites of iron, and oxide of manganese; but these proportions may be varified slightly without detriment to the product. The slag thus formed is a perfect non-conductor of electricity and because of its density and hardness can be used and subjected to rough usage such as would make glass chip and break.

In forming the various insulating devices the slag is, of course, remelted and manufactured by molding into the shapes desired in the same manner that glass is manufactured.

What I claim as new is—

An electric insulating material consisting of quartz, pyrites of iron, and oxide of manganese, made into a vitrified mass, substantially in the proportions and in the manner hereinbefore set forth.

JAMES OLNEY BROWN.

Witnesses:
JOSEPH J. KOEHLE,
H. W. SNAVELY.